United States Patent
Lin et al.

(10) Patent No.: US 8,564,834 B2
(45) Date of Patent: Oct. 22, 2013

(54) PRINTER CALIBRATION USING A SCANNER AND INTERPOLATED EQUIVALENT AIM CURVE

(75) Inventors: Guo-Yau Lin, Fairport, NY (US); James M. Sanchez, Rochester, NY (US); Connie F. Purdum, Rochester, NY (US); Adam E. Stein, Rochester, NY (US); Mustapha Guesmia, West Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 99 days.

(21) Appl. No.: 13/285,029

(22) Filed: Oct. 31, 2011

(65) Prior Publication Data

US 2013/0107290 A1    May 2, 2013

(51) Int. Cl.
  *H04N 1/56*    (2006.01)
  *H04N 1/60*    (2006.01)

(52) U.S. Cl.
  USPC .............................. 358/1.9; 358/504; 358/518

(58) Field of Classification Search
  USPC .................................. 358/1.9, 504, 518–523
  See application file for complete search history.

(56) References Cited

U.S. PATENT DOCUMENTS

| | | | |
|---|---|---|---|
| 6,032,004 A | 2/2000 | Mirabella, Jr. et al. | |
| 6,216,086 B1 | 4/2001 | Seymour et al. | |
| 6,834,229 B2 | 12/2004 | Rafiah et al. | |
| 7,307,752 B1 * | 12/2007 | Mestha et al. | 358/1.9 |
| 7,671,764 B2 | 3/2010 | Uyeki et al. | |
| 8,126,641 B2 | 2/2012 | Horvitz | |
| 2006/0197966 A1 | 9/2006 | Viturro et al. | |
| 2012/0089322 A1 | 4/2012 | Horvitz | |
| 2012/0206745 A1 * | 8/2012 | Shibuya | 358/1.9 |

OTHER PUBLICATIONS

Michael Sanchez et al., "Optimal Noise Management Method for a Robust Separation Based Calibration of Color Printing Systems", 2010 IS&T NIP, pp. 1-4.
Mu Qiao et al., "Subsampled Optimal Noise Management Method for a Robust Separation Based Calibration of Color Printing Systems", presented at EI, 2011, pp. 1-5.
Dalai et al., U.S. Appl. No. 12/859,760, filed Aug. 19, 2010.
Office Action Communication, U.S. Appl. No. 13/435,419, filed Mar. 30, 2012, Dated Mar. 30, 2012, pp. 1-37.

* cited by examiner

*Primary Examiner* — Scott A Rogers
(74) *Attorney, Agent, or Firm* — Gibb & Riley, LLC (57) ABSTRACT

Methods of performing print engine calibration create a color space conversion equation for a scanner of a class of printing devices, print test patches on a sheet, and scan the test patches using a scanner of the printing device to produce a scanned RGB value for each test patch. Such methods convert each scanned RGB value to an XYZ pseudo space using the color space conversion equation to produce XYZ values. These methods compare the XYZ values to second XYZ values of white paper to generate DeltaE curves for each of the test patches relative to white paper. The DeltaE curves are interpolated to form an equivalent aim curve. After the equivalent aim curve is determined, the methods periodically calibrate the same or an additional printing device that is within the class of printing devices using the color space conversion equation to produce second XYZ values.

20 Claims, 6 Drawing Sheets

PRINTER CALIBRATION USING A SCANNER AND INTERPOLATED EQUIVALENT AIM CURVE

BACKGROUND

Embodiments herein generally relate to printing device calibration, and more particularly to methods that scan the test patches, convert each scanned RGB value to an XYZ pseudo space using a color space conversion equation to produce XYZ values, and produce a resulting TRC.

In order to accurately produce a desired printing quality, it is necessary to know the quality level actually being produced by a printer. A tone response curve, most likely nonlinear due to the halftone design and the xerography, provides an illustration of a printer state at a specific time. A calibration tone reproduction curve (TRC) is a transfer function that brings the printer response to a desire state, for example, a linear relationship that produces linear output in density by giving a linear input. If the tone response curve is known, the calibration TRC can be computed and used to compensate for the nonlinearities of the printer. The printer response may change frequently. Thus, to accurately assess the performance of the printer, the tone response curve must be measured frequently in a calibration process.

Therefore, the printing system can be periodically calibrated to achieve color consistency for each of the printers of the same modality. To calibrate the printing system, generally a master printer is first calibrated with a spectrophotometer and a target value or set of target values (referred to herein as an aim curve) is generated for the master printer. The aim curve approaches an ideal or desired color response for the printer that, due to constraints of the printer and/or toners used, is not possible to reproduce exactly. The same aim curve is used in the calibration of the other printers.

SUMMARY

A method of performing print engine calibration herein begins by creating a "color space conversion" equation based on manufacturing specifications for a full width array RGB scanner bar (that is used on a printing device). The method prints "first" test patches using a previously established "master" calibration tone reproduction curve (TRC) relating to a "master" aim curve using a printing engine of the printing device. Then, the method scans the first test patches on the first sheet by passing the first sheet by the scanner bar to produce a first scanned RGB value for each first test patch. Next, the method converts each first scanned RGB value to an XYZ pseudo space using the color space conversion equation to produce first XYZ values.

Then, the method can compare the first XYZ values to XYZ values of white paper (or the patch that does not contain any halftone dots) to generate (DeltaE) curves for each of the first test patches and the white paper. The power (gamma) of the color space conversion equation is determined so the resultant DeltaE curves produced are approximately linear. Then, the method interpolates the DeltaE curves to form the "equivalent" aim curve.

After the equivalent aim curve is determined, the method can periodically calibrate any similarly designed printing device by printing a set (and subsequent) of test patches using an identity TRC (a unity transfer function) on a different sheet using the printing engine. The method scans the test patches on the sheet by passing the sheet by the scanner bar to produce a scanned RGB value for each test patch. The method then converts each scanned RGB value to an XYZ pseudo space using the color space conversion equation to produce XYZ values. Next, the method produces a "resulting" TRC for the XYZ values based on the equivalent aim curve.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Traditionally calibration for high-end printers is achieved via a spectrophotometer. Today, many mid-range printers are equipped with built-in scanners (flat-bed or inline "scanbar", measuring in RGB space). These color sensitive input devices can be utilized for data acquisition during the calibration procedure. In general, RGB sensitive scanners provide broadband color information more related to the integrated, broadband, tristimulus values than the spectral reflectance that emits from true spectrophotometers.

Therefore, without further processing of the measured RGB data, scanner type color accuracy is not adequate for high image quality tasks such as printer calibration. Further, building a scanner profile is time consuming or even unfeasible, especially when the accuracy requirement is critical. Therefore, the methods herein use scanner color information, acquired by RGB sensitive arrays. The methods herein are enabled by the development of a "pseudo tristimulus value" or "pseudo XYZ" color space, along with an "aim" for calibration that is linear within this "pseudo XYZ" color space.

The methods herein perform printer calibration using an inline scan bar utilizing a linearized, "pseudo XYZ" space that is linearly related to common RGB spaces. The goal is to generate a TRC (tone reproduction curve) that mimics the capability and result generated via a spectrophotometer, using just an FWA scanner bar.

Thus, with methods herein a "pseudo XYZ" space is developed which is based on a common, tunable, RGB space. Then, a calibration target is printed through the identity TRC, and the scanned RGB data is converted to a pseudo space using an RGB-to-XYZ-like conversion with a power of $\gamma$. "Gamma", $\gamma$ is determined so the resultant "DeltaE" from white paper for the separation step wedges (derived from the results of the pseudo XYZ space) can be as linear as possible. For purposes herein, the DeltaE is the measured luminance from white paper.

The preceding result is related directly to a spectrophometric result by printing the same target through a calibration TRC derived by the spectrophotometer. The resultant scanned RGB can be converted to the same pseudo space, and the aim is created by computing DeltaE from white paper through this pseudo space. Finally, the scanner based TRC is generated by inverting the DeltaE from white paper, and is computed from the scanned RGB to match the aim.

The methods herein use only information from the scanner itself by the development of a pseudo XYZ space, where the link to the spectrophotometer is made though the aim, not through direct coupling of the scanner data to the printer data. In the final product, the methods herein use the aim generated as noted above, because it is printer independent and does not need to be updated based on the color outcome of the printer. The methods herein can be used with any print engine equipped with a built-in scan bar in the paper path, such as a FWA—full width array, essentially a stationary scan bar installed in the paper path after fusing devices.

Figure 1:
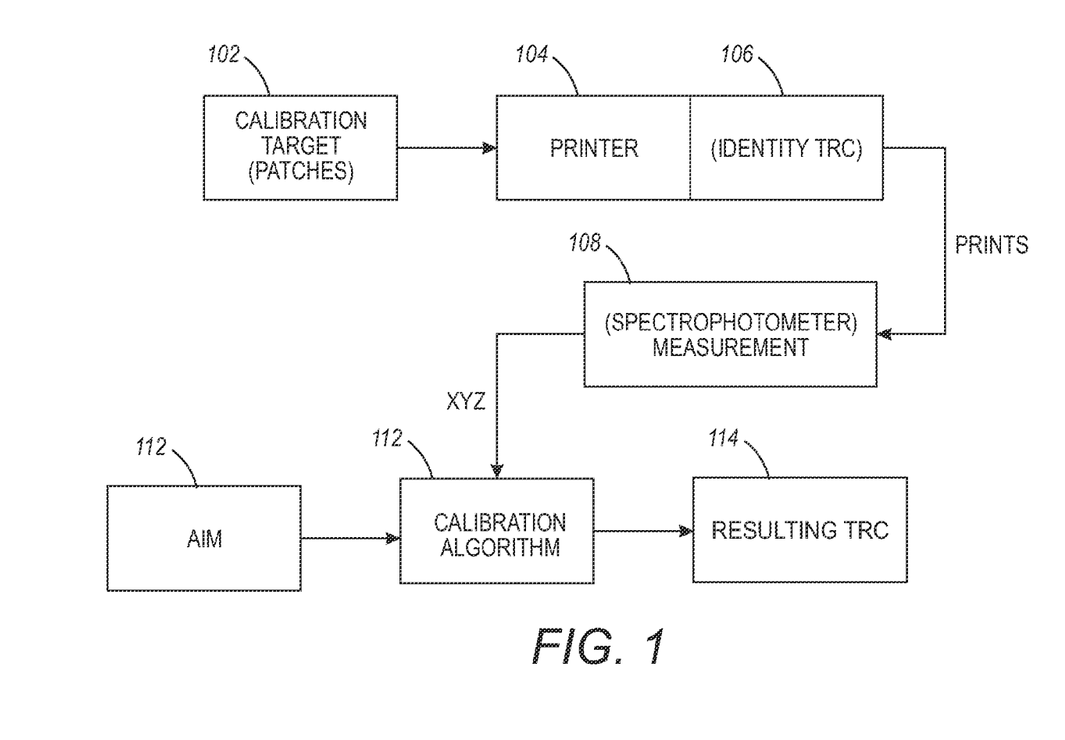
FIG. 1 is a flow diagram according to embodiments herein.

FIG. 1 illustrates a spectrophotometric based calibration, where a resulting TRC 114 is created during a print engine calibration, performed with an offline spectrophotometer. The spectrophotometric based calibration in FIG. 1 can use the following procedure: print a known set of patches 102 through the native print engine state (native state can be achieved by printing 104 through the identity TRC 106), measure 108 each patch using the spectrophotometer, and calculate the resulting TRC 114 to match an aim 110 using a calibration algorithm 112. FIG. 1 shows the resulting TRC 114 that encodes a specific, targeted aim in the departure from white paper metric (sometimes referred to herein as "dEab"). The measurement of the spectrophotometer 108 is highly accurate and of very high quality because it is (first in spectral data and then converted) in XYZ space. To the contrary, RGB data obtained from full width array scanners is not as accurate and does not produce the same quality printer calibration.

One feature herein is to perform print engine calibration using an inexpensive inline scan bar as the measurement instrument, yet so the resultant TRC is similar, or identical, in quality and accuracy, to that realized with a more expensive spectrophotometer. While many different scanners are currently available (and many different scanners may be developed in the future) for purposes herein one distinction between an inline scanner (full width array scanner) and a spectrophotometer is that the full width array scanner produces RGB data, while the spectrophotometer produces data in the XYZ space. Note that linear color values can comprise, for example: tristimulus values XYZ (as defined by the CIE (International Commission on Illumination)); red, green, blue (RGB); or luminance component Y, and two chromatic components C1 and C2 (YCC). As is understood by those ordinarily skilled in the art, the XYZ space is more extensive than that reached by the RGB data and therefore the data within the XYZ space produces a higher quality calibration. The downside of using a spectrophotometer is that it is presents an additional cost to the full width array scanner that is currently already in place in many printers today.

In order to produce the same quality calibration found with a spectrophotometer, but simply using the inline full width array scanner, the methods herein convert the RGB data into XYZ pseudo space. More specifically, the resulting TRC 114 created from the FWA measurement data is obtained through the following process: deriving the pseudo XYZ space (offline), realizing the equivalent aim that yields a spectrophotometric like result (offline), and performing the calibration using the pseudo XYZ space and the equivalent aim (real time).

Figure 2:
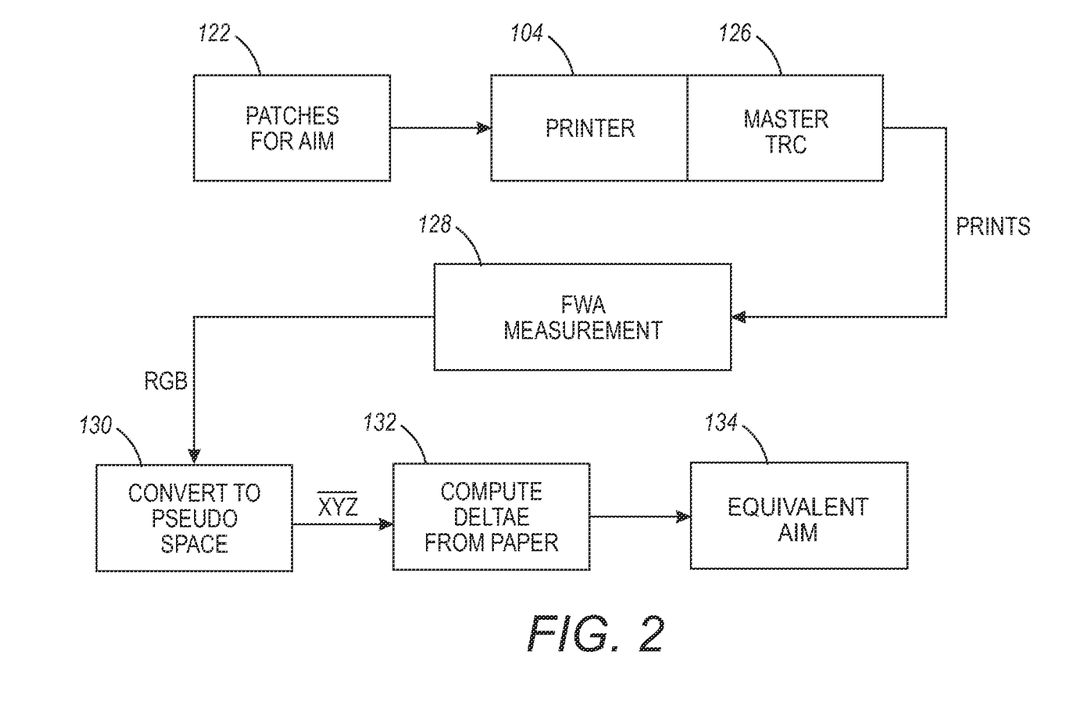
FIG. 2 is a flow diagram according to embodiments herein.

In order to drive the pseudo space, as shown in FIG. 2, the processes herein print step wedges (patches 122) for each separation through the native printer state 104 according to a master TRC 126. Each patch is scanned by the inline FWA in the paper path 128. The scanned RGB value for each patch is converted to a pseudo space 130 using an RGB-to-XYZ-like conversion equation with a power of $\gamma$, where $\gamma$ is determined so the resultant DeltaE from white paper 132 for the separation step wedges can be as linear as possible, as shown below:

$$\begin{bmatrix} \overline{X} \\ \overline{Y} \\ \overline{Z} \end{bmatrix} = [A] \begin{bmatrix} R \\ G \\ B \end{bmatrix}^\gamma = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R \\ G \\ B \end{bmatrix}^\gamma \quad (1)$$

Where the matrix A is the sRGB to XYZ matrix for d50. Since the input is not in sRGB, therefore, the output is not XYZ. Thus, this space is referred to as the pseudo XYZ space, hence noted as $\overline{XYZ}$.

The pseudo XYZ for white paper, $\overline{XYZ}_{paper}$, is computed by plugging in the RGB value scanned from the FWA using Eq. (1). DeltaE from white paper in the pseudo space is computed as follows: first the pseudo L*a*b* value is computed for each patch using the following formula, $$\overline{L^*} = 116 f(\overline{Y}/\overline{Y}_{paper}) - 16 \quad (2)$$
$$\overline{a^*} = 500[f(\overline{X}/\overline{X}_{paper}) - f(\overline{Y}/\overline{Y}_{paper})]$$
$$\overline{b^*} = 200[f(\overline{Y}/\overline{Y}_{paper}) - f(\overline{Z}/\overline{Z}_{paper})]$$

where $$f(t) = \begin{cases} t^{1/3} & \text{if } t > \left(\frac{6}{29}\right)^3 \\ \frac{1}{3}\left(\frac{29}{6}\right)^2 t + \frac{4}{29} & \text{otherwise} \end{cases}$$

Secondly, the DeltaE from paper for each patch is computed as follows:

$$\text{Delta}\overline{E} = ((\overline{L^*}-\overline{L^*}_{paper})^2 + (\overline{a^*}-\overline{a^*}_{paper})^2 + (\overline{b^*}-\overline{b^*}_{paper})^2)^{1/2} \quad (3)$$

where $\overline{L^*}_{paper}=100$, $\overline{a^*}_{paper}=0$, and $\overline{b^*}_{paper}=0$. Next, the DeltaE from paper for each separation is plotted using different $\gamma$ values, and a $\gamma$ value is empirically chosen to achieve a roughly linear DeltaE from paper curve. Note that L*a*b* space is a color-opponent space with dimension L* for lightness and a* and b* for the color-opponent dimensions, based on nonlinear functions of the CIE (International Commission on Illumination) XYZ color space coordinates.

Figure 3:
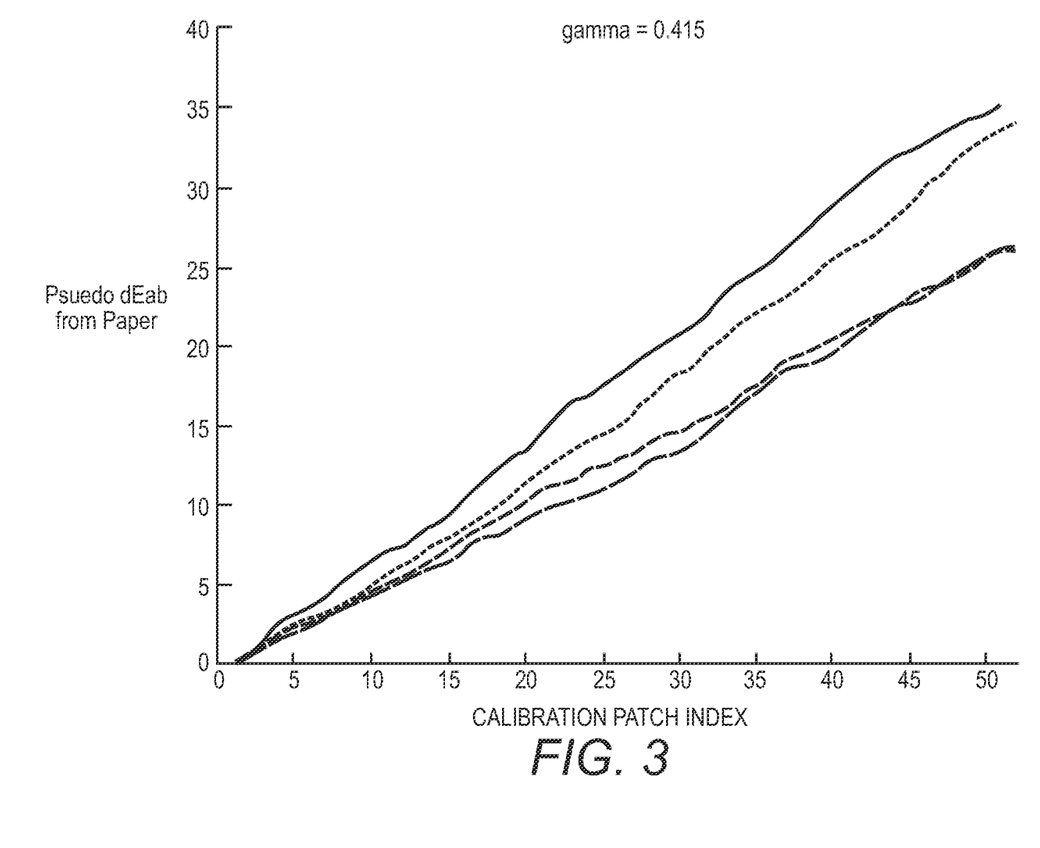
FIG. 3 is a chart showing approximately linear DeltaE curves according to embodiments herein.

FIG. 3 illustrates the DeltaE from white paper computed from the pseudo XYZ. Note that $\gamma$ is chosen to be 0.4167 so the DeltaE from paper curve can be as linear as possible. While a specific gamma value is shown above, those ordinarily skilled in the art would understand that different gamma values would produce approximately linear DeltaE curves for different scanners and different printing engines (and would again be empirically chosen as each separation is plotted using different $\gamma$ values, and a $\gamma$ value). The more linear the DeltaE curve is, the better the quality of the data, and the lower the loss of precision. The purpose of linearization of the DeltaE curve is to maximize the indexing into the dynamic range of the psuedo dEab metric (derived from the pseudo XYZ space) during the inversion, thereby maximizing use of the reduced dynamic range of the scanbar itself, relative to the spectrophotometer.

Thus, FIG. 2 shows how the equivalent aim is realized. In item 122, the step wedges (patches) for each separation are printed 104 through the master TRC 126, that is potentially previously calculated from spectrophotometer. In item 128, each patch is scanned by the inline FWA. The scanned RGB value for each patch is then converted to the same XYZ pseudo space in item 130. In item 132, the methods herein compute DeltaE from white paper through this pseudo space. Then, in item 134, the methods herein interpolate the DeltaE curves to produce the equivalent aim for FWA calibration. Once the equivalent aim is generated by one printing machine, other similar printing machines (machines within the same class of machine, for example) can simply perform the calibration process shown in FIG. 4, without having to generate the equivalent aim using the process shown in FIG. 2. One point to again note is that the equivalent aim is generated without using the more expensive spectrophotometer, because this processing only uses the less expensive, already installed FWA scanner.

Figure 4:
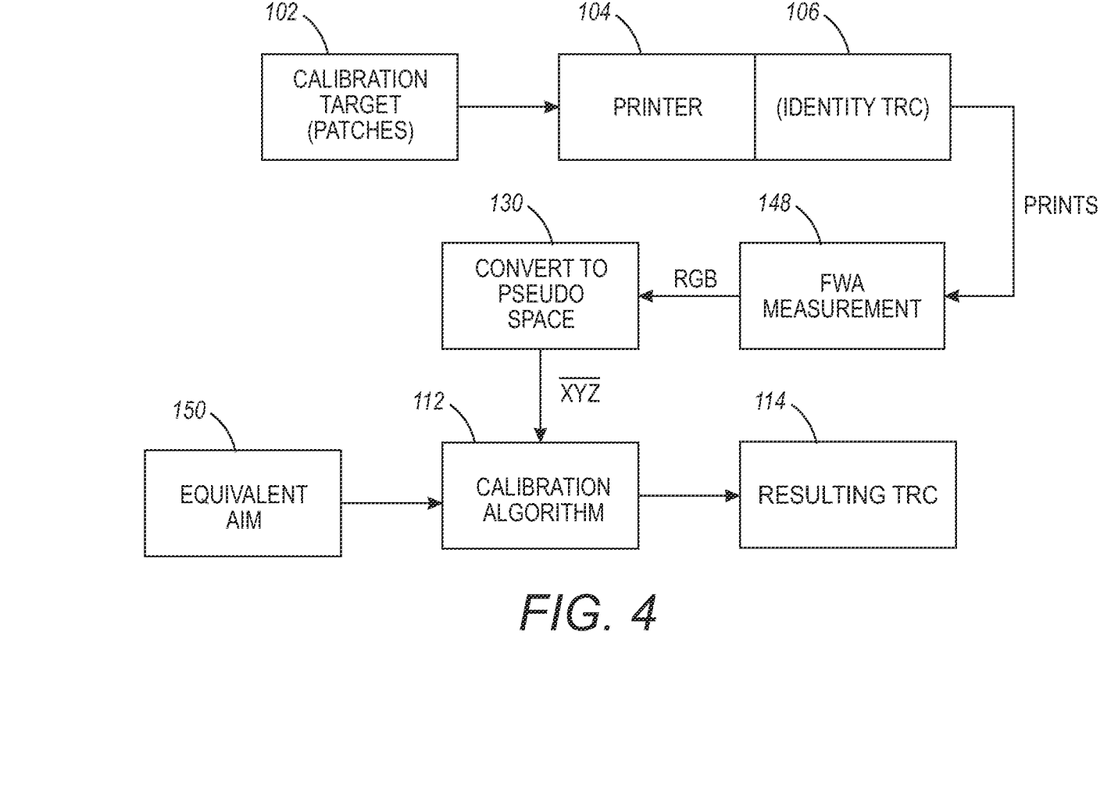
FIG. 4 is a flow diagram according to embodiments herein.

More specifically, FIG. 4 illustrates the individual calibration process that can be performed on a regular basis on each printing machine, once the equivalent aim has been generated for that printer or class of printer. More specifically, the calibration target 102 is still printed through the native print engine state 104 using the same identity TRC 106. The inline FWA scanner 148 is used to scan the printed patches, and the measured RGB from the patches is converted to the pseudo space in item 130. The resulting TRC 114 is generated by using the equivalent aim 150 through the calibration algorithm 112. This resulting TRC is then used as the correction for all printing, until the next time a calibration process is performed.

Thus, these methods provide separation-based calibration. Such methods are also suitable for calibration using any "aim" based methods where a pseudo XYZ space can be derived and used. For example, if a Lab aim based algorithm is used, the same procedure can be applied, except for driving the equivalent aim. In this case, the equivalent aim will be realized by using a C=M=Y neutral target in the processing shown in FIG. 2, and the equivalent aim will be a neutral line in the pseudo space, instead of four primary lines in the pseudo space.

The embodiments here use a less expensive FWA scanner, but produce the same quality as a spectrophotometer by matching the TRC quality created from the data acquired via a spectrophotometer. Further, these methods provide consistent output, because the aim is encoded in the pseudo device independent space and does not change as a function of the print engine outcome. Therefore, even if the scanner itself is unstable, if the equivalent aim is produced using the printer that is calibrated, there is no need to recalibrate scanner.

The methods herein are tunable to the look and feel of "Offset" CMYK (cyan, magenta, yellow, black) prints. Also, these methods provide ease of use, because the measurement data acquisition occurs during printing, and there is no need to manually measure the patches with an external or hand held spectrophotometer device, nor to bring the print target to another spectrophotometer device for measuring. The embodiments herein lower user costs because the FWA scanner is already in place, and there is no need to purchase additional spectrophotometer.

Figure 5:
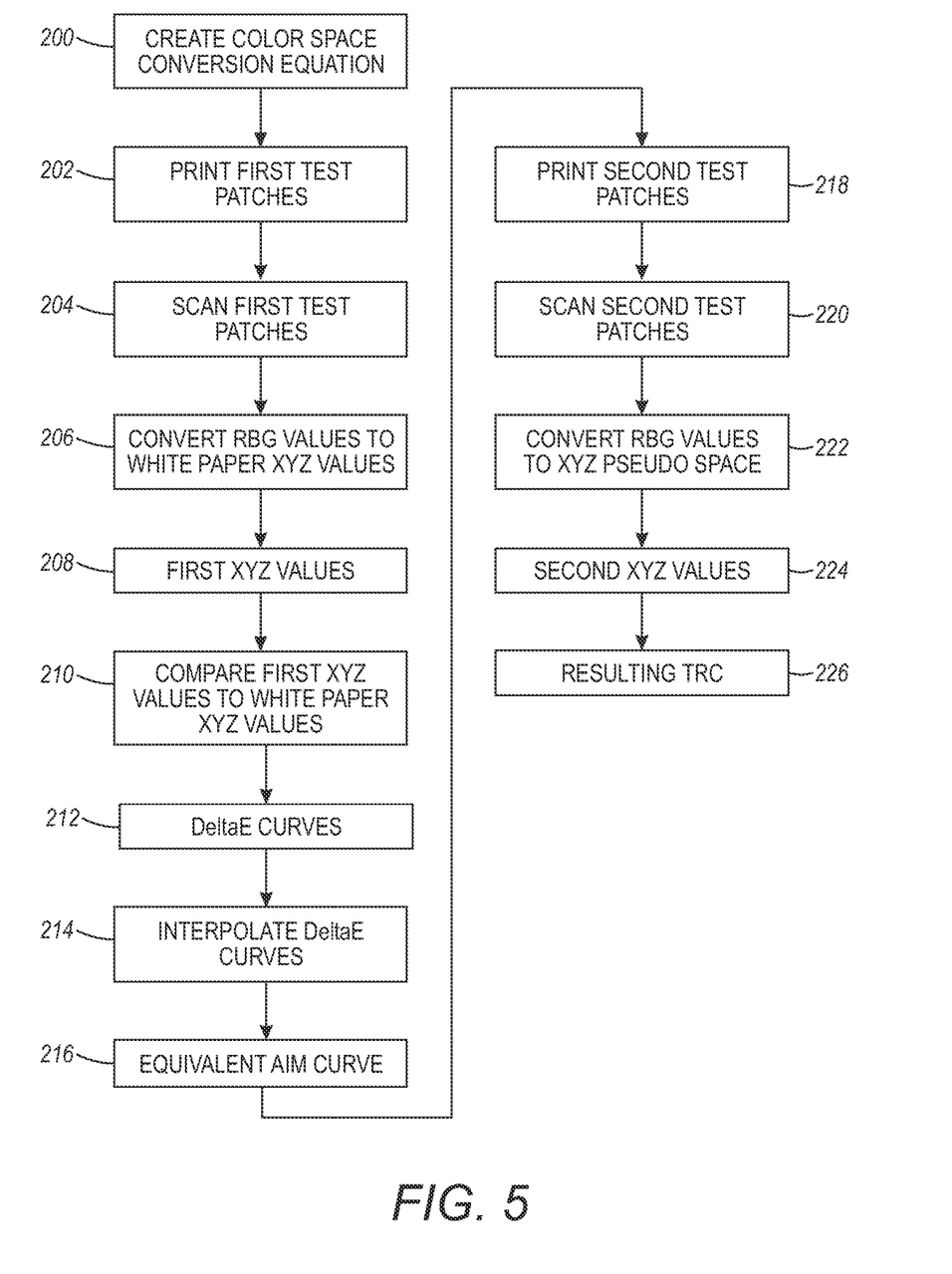
FIG. 5 is a flow diagram according to embodiments herein.

FIG. 5 is flowchart illustrating an exemplary method of performing print engine calibration according to embodiments herein. More specifically, in item 200, the methods herein create a color space conversion equation based on manufacturing specifications for a scanner of an arbitrarily named "first" printing device classified within a class of printing devices. For example, since a scanner bar is presumed to be within a given manufacturing specification, the scanner profile can be created. These methods select a power (gamma) of the color space conversion equation that resultants in the DeltaE curves produced below all being approximately linear, as discussed above.

In item 202, these methods print test patches (which are arbitrarily referred to herein as "first test patches") on an arbitrarily named "first sheet" using a previously established master tone reproduction curve (TRC) relating to a master aim curve for the class of printing devices using a printing engine of the first printing device. Such a master TRC can be historically determined by scanning test patches (which could be similar to the first test patches) by passing a printed sheet (which could be similar to the first sheet) by a spectrophotometer to produce a scanned XYZ value for each first test patch, and then, producing the master TRC for the scanned XYZ values based on the master aim curve. Such curves can be found in a library or other repository and the methods herein do not need to use a spectrophotometer when performing printer calibration.

Other than obtaining the previously established master TRC (that may have been obtained using a spectrophotometer historically) the methods herein avoid the need to use a spectrophotometer when performing the actual printer calibration process. Instead, the methods herein use the less expensive and commonly available (or already installed) full width array RGB scanner bar, and convert the RGB values from the scanner bar into XYZ values (in XYZ pseudo space) using the color space conversion equation to produce a resulting TRC that matches the quality of the master TRC during printer calibration. In other words, the printing produced by a printer being calibrated is not scanned using a spectrophotometer (even though some TRC curves used in the test patch printing may have historically be found using spectrophotometers). Therefore, these methods use the printer's scanner bar in place of a spectrophotometer when performing calibration, but still produce the same quality XYZ space-based TRC curve that would be produced by a spectrophotometer, by performing RGB to XYZ pseudo space conversions (using the color space conversion equation).

In item 204, these methods then scan the first test patches by passing the first sheet by the scanner to produce a first scanned RGB value for each first test patch (item 206). Next, in item 206, these methods convert each first scanned RGB value to an XYZ pseudo space using the color space conversion equation to produce first XYZ values (items 208), as discussed above.

In item 210, these methods compare the first XYZ values to arbitrarily named "second" XYZ values of white paper to generate DeltaE curves (item 212) for each of the first test patches relative to white paper. XYZ values (in XYZ pseudo space) of white paper can be found by scanning RGB from a paper white patch and converting the scanned RGB value to the XYZ pseudo space. In item 214, these methods interpolate the DeltaE curves to form an equivalent aim curve (item 216) that is different than the master aim curve.

After the equivalent aim curve is determined, these methods periodically calibrate one or more arbitrarily named "second" printing devices that are within the same class of printing devices as the first printing device (as shown in items 218-228). For purposes herein, any classification logic can be utilized to establish different classes of printing devices. For example, all printing devices having a certain model designation could be included within a given class. Alternatively, all printing devices that use a specific style of scanner bar and printing engine could be considered to be within a given class (irrespective of manufacturer or serial number). The "first" printing device mentioned above could be in the class of "second" printing devices and, therefore, the first printing device could be one of the second printing devices.

More specifically, when calibrating the second printing device(s), these methods print arbitrarily named "second" test patches on an arbitrarily named "second" sheet using an identity TRC in item 218. This printing uses a printing engine of the second printing device in item 218. Note that while individual "first" and "second" sheets are used in the examples herein, those ordinarily skilled in the art would understand that the test patches could be printed on multiple sheets and these multiple sheets could be scanned using the scanner bar. Many hundreds or even thousands of color patches are available to be printed and measured, and as one example, the standard IT8.7/4 test pattern according to the NPES Standards Blue Book commonly used for profiling has 1617 patches.

The identity TRC is linear and, therefore, makes no alterations to printing input, such that the input equals the output when using the identity TRC. When performing calibration, the output should be the same as input so that the printer can be evaluated in an uncorrected manner (uncorrected by a non-linear TRC) and therefore, an identity TRC is utilized when performing such calibration.

In item 220, the calibration process continues for the second device(s) in which the second test patches are scanned by passing the second sheet by a scanner of the second printing device. This produces a second scanned RGB value for each second test patch. Further, in the calibration process in item 222, these methods convert each second scanned RGB values to the XYZ pseudo space using the color space conversion equation to produce second XYZ values (item 224).

To finish the calibration process for the second printing device(s), in item 226, these methods produce a resulting TRC for the second XYZ values based on the equivalent aim curve. This resulting TRC then provides the necessary correction to actions of the printing engine to make day-to-day printing approach the master aim curve, until the next calibration operation.

Figure 6:
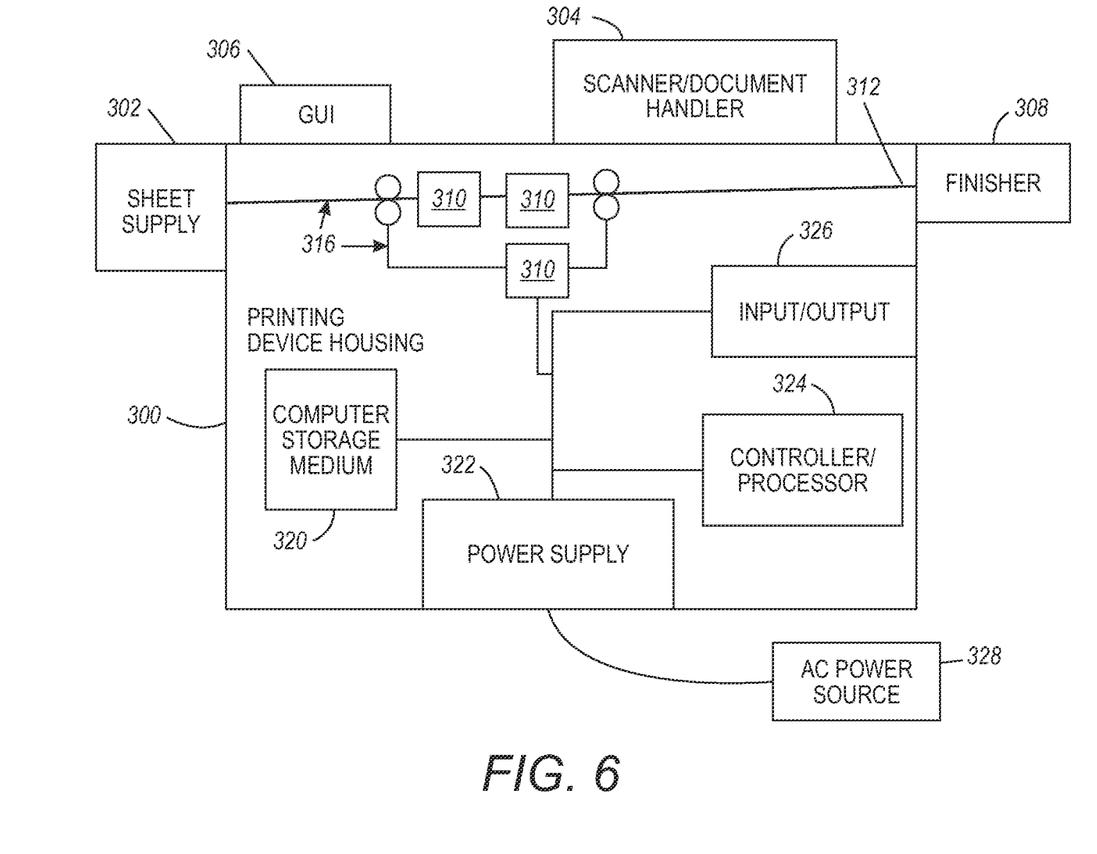
FIG. 6 is a flow diagram of an exemplary printing device according to embodiments herein.

FIG. 6 illustrates a computerized printing device 300, which can be used with embodiments herein and can comprise, for example, a printer, copier, multi-function machine, etc. The printing device 300 includes a controller/processor 324, at least one marking device (printing engines) 310 operatively connected to the processor 324, a media path 316 positioned to supply sheets of media from a sheet supply 302 to the marking device(s) 310 and a communications port (input/output) 326 operatively connected to the processor 324 and to a computerized network external to the printing device. Further, an inline scanner 312 (which can include a full width array scanner bar) can be used to automatically scan sheets after they are printed, but before they are output from the printing device 300. After receiving various markings from the printing engine(s), the sheets of media can optionally pass to a finisher 308 which can fold, staple, sort, etc., the various printed sheets.

Also, the printing device 300 can include at least one accessory functional component (such as a scanner/document handler 304 (which can also include a full width array scanner bar), sheet supply 302, finisher 308, etc.) and graphic user interface assembly 306 that also operate on the power supplied from the external power source 328 (through the power supply 322).

The input/output device 326 is used for communications to and from the multi-function printing device 300. The processor 324 controls the various actions of the printing device. A non-transitory computer storage medium device 320 (which can be optical, magnetic, capacitor based, etc.) is readable by the processor 324 and stores instructions that the processor 324 executes to allow the multi-function printing device to perform its various functions, such as those described herein.

Thus, a printer body housing 300 has one or more functional components that operate on power supplied from the alternating current (AC) 328 by the power supply 322. The power supply 322 connects to an external alternating current power source 328 and converts the external power into the type of power needed by the various components.

As would be understood by those ordinarily skilled in the art, the printing device 300 shown in FIG. 6 is only one example and the embodiments herein are equally applicable to other types of printing devices that may include fewer components or more components. For example, while a limited number of printing engines and paper paths are illustrated in FIG. 6, those ordinarily skilled in the art would understand that many more paper paths and additional printing engines could be included within any printing device used with embodiments herein.

In such a computerized (printing) device 300, the processor 324 can create the color space conversion equation based on manufacturing specifications for the full width array scanner bars in the scanners 304, 312. The processor 324 can cause the printing engine(s) 310 to print the first test patches using the previously established master tone reproduction curve (TRC) that relates to the master aim curve using. Then, the processor 324 causes/uses the scanners 304, 312 to scan the first test patches on the first sheet by passing the first sheet by one of the scanner bars to produce a first scanned RGB value for each first test patch. Next, the processor 324 converts each first scanned RGB value to an XYZ pseudo space using the color space conversion equation to produce first XYZ values.

Then, the processor 324 compares the first XYZ values to the XYZ values of the white paper to generate (DeltaE) curves for each of the first test patches and the white paper. Again the color space conversion equation is determined so the resultant DeltaE curves produced are approximately linear. Then, the processor 324 interpolates the DeltaE curves to form the "equivalent" aim curve.

Then, on any printing device in the class, once the equivalent aim curve has been determined on one of the printing devices in the class, the processor 324 can periodically calibrate the printing engine(s) 310 by printing a set (and subsequent) of test patches using the identity TRC on a different sheet using the printing engine(s) 310. The processor 324 causes the scanner 312 to scan or uses scans from scanner 3 of the test patches on the sheet by passing the sheet by the scanner bar (304/312) to produce a scanned RGB value for each test patch. The processor 324 then converts each scanned RGB value to an XYZ pseudo space using the color space conversion equation to produce XYZ values. Next, the processor 324 produces a "resulting" TRC for the XYZ values based on the equivalent aim curve.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example ascular order, number, position, size, shape, angle, color, or material.

What is claimed is:

1. A method of performing print engine calibration comprising:
    creating a color space conversion equation for a scanner of a class of printing devices;
    printing first test patches on a first sheet using a previously established master tone reproduction curve (TRC) relating to a master aim curve for said class of printing devices using a printing engine of said a printing device within said class of printing devices;
    scanning said first test patches using a scanner of said printing device to produce a first scanned RGB value for each first test patch;
    converting each said first scanned RGB value to an XYZ pseudo space using said color space conversion equation to produce first XYZ values;
    comparing said first XYZ values to second XYZ values of white paper to generate DeltaE curves for each of said first test patches relative to white paper;
    interpolating said DeltaE curves to form an equivalent aim curve; and
    after said equivalent aim curve is determined, periodically calibrating any printing device that is within said class of printing devices using said color space conversion equation to produce second XYZ values and producing a resulting TRC for said second XYZ values based on said equivalent aim curve.

2. The method according to claim 1, further comprising selecting a power of said color space conversion equation that resultants in said DeltaE curves all being approximately linear.

3. The method according to claim 1, further comprising:
    scanning said first test patches by passing said first sheet by a spectrophotometer to produce a scanned XYZ value for each first test patch; and
    producing said master TRC for said scanned XYZ values based on said master aim curve.

4. The method according to claim 3, said resulting TRC matching a quality of said master TRC using said scanner in place of said spectrophotometer.

5. The method according to claim 1, said scanner comprising a full width array scanner.

6. A method of performing print engine calibration comprising:
    creating a color space conversion equation for a scanner of a class of printing devices;
    printing first test patches on a first sheet using a previously established master tone reproduction curve (TRC) relating to a master aim curve for said class of printing devices using a printing engine of said a first printing device within said class of printing devices;
    scanning said first test patches using a scanner of said first printing device to produce a first scanned RGB value for each first test patch;
    converting each said first scanned RGB value to an XYZ pseudo space using said color space conversion equation to produce first XYZ values;
    comparing said first XYZ values to second XYZ values of white paper to generate DeltaE curves for each of said first test patches relative to white paper;
    interpolating said DeltaE curves to form an equivalent aim curve;
    after said equivalent aim curve is determined, periodically calibrating a second printing device that is within said class of printing devices by:
        printing second test patches on a second sheet using a printing engine of said second printing device;
        scanning said second test patches by passing said second sheet by a scanner of said second printing device to produce a second scanned RGB value for each second test patch;
        converting each said second scanned RGB value to said XYZ pseudo space using said color space conversion equation to produce second XYZ values; and
        producing a resulting TRC for said second XYZ values based on said equivalent aim curve.

7. The method according to claim 6, further comprising selecting a power of said color space conversion equation that resultants in said DeltaE curves all being approximately linear.

8. The method according to claim 6, further comprising:
    scanning said first test patches by passing said first sheet by a spectrophotometer to produce a scanned XYZ value for each first test patch; and
    producing said master TRC for said scanned XYZ values based on said master aim curve.

9. The method according to claim 8, said resulting TRC matching a quality of said master TRC using said scanner in place of said spectrophotometer.

10. The method according to claim 6, said scanner comprising a full width array scanner.

11. A method of performing print engine calibration comprising:

creating a color space conversion equation based on manufacturing specifications for a scanner of a first printing device classified within a class of printing devices;

printing first test patches on a first sheet using a previously established master tone reproduction curve (TRC) relating to a master aim curve for said class of printing devices using a printing engine of said first printing device;

scanning said first test patches by passing said first sheet by said scanner to produce a first scanned RGB value for each first test patch;

converting each said first scanned RGB value to an XYZ pseudo space using said color space conversion equation to produce first XYZ values;

comparing said first XYZ values to second XYZ values of white paper to generate DeltaE curves for each of said first test patches relative to white paper;

interpolating said DeltaE curves to form an equivalent aim curve that is different than said master aim curve;

after said equivalent aim curve is determined, periodically calibrating a second printing device that is within said class of printing devices by:

printing second test patches on a second sheet using an identity TRC using a printing engine of said second printing device, said identity TRC making no alterations to printing input;

scanning said second test patches by passing said second sheet by a scanner of said second printing device to produce a second scanned RGB value for each second test patch;

converting each said second scanned RGB value to said XYZ pseudo space using said color space conversion equation to produce second XYZ values; and producing a resulting TRC for said second XYZ values based on said equivalent aim curve.

12. The method according to claim 11, further comprising selecting a power of said color space conversion equation that resultants in said DeltaE curves all being approximately linear.

13. The method according to claim 11, further comprising:
scanning said first test patches by passing said first sheet by a spectrophotometer to produce a scanned XYZ value for each first test patch; and
producing said master TRC for said scanned XYZ values based on said master aim curve.

14. The method according to claim 13, said resulting TRC matching a quality of said master TRC using said scanner in place of said spectrophotometer.

15. The method according to claim 11, said scanner comprising a full width array scanner.

16. A non-transitory computer storage medium readable by a computerized device, said non-volatile computer storage medium storing instructions executable by said computerized device to perform a method of print engine calibration, said method comprising:

creating a color space conversion equation for a scanner of a class of printing devices;

printing first test patches on a first sheet using a previously established master tone reproduction curve (TRC) relating to a master aim curve for said class of printing devices using a printing engine of said a first printing device within said class of printing devices;

scanning said first test patches using a scanner of said first printing device to produce a first scanned RGB value for each first test patch;

converting each said first scanned RGB value to an XYZ pseudo space using said color space conversion equation to produce first XYZ values;

comparing said first XYZ values to second XYZ values of white paper to generate DeltaE curves for each of said first test patches relative to white paper;

interpolating said DeltaE curves to form an equivalent aim curve; and after said equivalent aim curve is determined, periodically calibrating a second printing device that is within said class of printing devices using said color space conversion equation to produce second XYZ values and producing a resulting TRC for said second XYZ values based on said equivalent aim curve.

17. The non-transitory computer storage medium according to claim 16, said method further comprising selecting a power of said color space conversion equation that resultants in said DeltaE curves all being approximately linear.

18. The non-transitory computer storage medium according to claim 16, said method further comprising:
scanning said first test patches by passing said first sheet by a spectrophotometer to produce a scanned XYZ value for each first test patch; and
producing said master TRC for said scanned XYZ values based on said master aim curve.

19. The non-transitory computer storage medium according to claim 18, said resulting TRC matching a quality of said master TRC using said scanner in place of said spectrophotometer.

20. The non-transitory computer storage medium according to claim 16, said scanner comprising a full width array scanner.

* * * * *